(12) United States Patent
Venna et al.

(10) Patent No.: US 7,539,245 B2
(45) Date of Patent: May 26, 2009

(54) SYSTEM AND METHOD FOR DIGITAL TRANSMISSION AND MODULATION OF CONJUGATE PULSE POSITION

(75) Inventors: Shubhra Venna, Bangalore (IN); Shiban Kishan Kak, Noida (IN)

(73) Assignee: General Electric Company, Schenectady, NY (US)

( * ) Notice: Subject to any disclaimer, the term of this patent is extended or adjusted under 35 U.S.C. 154(b) by 721 days.

(21) Appl. No.: 10/743,690

(22) Filed: Dec. 19, 2003

(65) Prior Publication Data

US 2004/0136454 A1 Jul. 15, 2004

(30) Foreign Application Priority Data

Dec. 24, 2002 (IN) .............................. 1296/DEL/02

(51) Int. Cl.
*H03K 7/04* (2006.01)
*H03K 9/04* (2006.01)
(52) U.S. Cl. ..................................................... 375/239
(58) Field of Classification Search ................. 375/239, 375/242, 200, 343, 207, 237, 238, 241, 262, 375/265; 370/212, 213; 329/313, 314; 332/112–114
See application file for complete search history.

(56) References Cited

U.S. PATENT DOCUMENTS

| 4,206,316 | A | * | 6/1980 | Burnsweig et al. ......... 178/66.1 |
|---|---|---|---|---|
| 5,042,086 | A | | 8/1991 | Cole et al. |
| 5,623,511 | A | * | 4/1997 | Bar-David et al. .......... 375/143 |
| 5,883,925 | A | | 3/1999 | Sinibaldi et al. |
| 6,185,346 | B1 | | 2/2001 | Asawa et al. |
| 6,278,385 | B1 | * | 8/2001 | Kondo et al. ................... 341/50 |
| 6,362,903 | B1 | | 3/2002 | Spickerman et al. |
| 2003/0035187 | A1 | * | 2/2003 | Richardson et al. ......... 359/189 |
| 2003/0142742 | A1 | * | 7/2003 | Hartmann .................... 375/239 |
| 2003/0145036 | A1 | * | 7/2003 | Hartmann et al. ........... 709/201 |

FOREIGN PATENT DOCUMENTS

WO WO 02/096052 * 11/2002

* cited by examiner

*Primary Examiner*—Young T. Tse
(74) *Attorney, Agent, or Firm*—Peter Vogel, Esq.; Chad Bement, Esq.; Michael G. Smith, Esq.

(57) ABSTRACT

The invention relates to a communication system comprising a modulator, encoder, decoder, demodulator, and a data input source, which employs an improved modulation technique by effectively utilizing the conjugate signal space in Digital Pulse Position Modulation (DPPM) format. This technique utilizes multiple the DPPM formats, whereby M data bits are conveyed by splitting them into sets of k bits. The split data are encoded to have forward and conjugate pulse positions for transmission over a transmission channel, which are discriminated and combined into a M-bit digital output. The system and method achieve superior characteristics in terms of data rate, channel utilization and coding efficiency.

20 Claims, 6 Drawing Sheets

SYSTEM AND METHOD FOR DIGITAL TRANSMISSION AND MODULATION OF CONJUGATE PULSE POSITION

FIELD OF THE INVENTION

The present invention relates to a communication system and a method of transmitting coded digital data over long distances using improved modulation technique. The present invention may be particularly useful in applications such as real time monitoring in broadband transmission using Cyclotron, remote monitoring applications using C-Arm, patient monitoring systems like Solar®, Dash® and CIC®, products deploying Wireless Medical Telemetry Services (WMTS) and telemonitoring applications.

DESCRIPTION OF RELATED ART

Conventionally, various modulation techniques are available for minimizing transmission losses and to achieve error free communication at high speeds while transmitting high frequency analog signals over long distances. In typical applications such as mobile phones and satellite communication, conventional digital modulation techniques such as Pulse Code Modulation (PCM) and Digital Pulse Position Modulation (DPPM) technique are commonly employed.

However, the PCM technique offers low receiver sensitivity, while the DPPM technique is found to consume comparatively more bandwidth for transmission of equivalent information.

Another known technique is Pulse Time Modulation (PTM) which enables sending coded signals over long distances consuming low average power, offering large noise tolerance and better channel efficiency.

However, in applications where high-speed data access is required, specialized modulation techniques are required to efficiently handle a large amount of data at a higher transmission data rate.

U.S. Pat. No. 6,185,346 entitled "Propagation in lowest order modes of multimode graded index fiber, resulting in very low transmission loss, low modal noise, high data security, and high data rate capabilities" issued on Feb. 6, 2001 to Asawa et al., discloses an optical fiber communication system where data light is launched into a very small set of the lowest order propagation modes of multimode graded-index fibers, resulting in very high data rate transmission capability. The light launched into a small set of a few lowest order propagation modes or launched only into the fundamental propagation mode of multimode graded-index fiber converts into and within a limited small set of lowest order modes due to severe bending perturbations that may occur in deployed multimode graded-index fiber transmission cable. Low modal time dispersion of the limited small set of lowest order modes is much less than when all modes of the multimode graded-index fiber are launched, yielding a much higher data rate transmission capability.

U.S. Pat. No. 6,362,903 B1 entitled "Use of Higher Order Modulation techniques to transmit information on passbands of a dispersion-limited fiber link" issued on Mar. 26, 2002 to Spickerman et al., discloses systems and methods employing higher order modulation techniques to transmit information on passbands of a dispersion-limited fiber optic communication link. Accordingly, data is transmitted on previously unused passbands of the dispersion-limited optic link, thus increasing the total capacity of the link. Higher order modulated carrier frequencies (M-ary ASK, PSK, QAM, etc.) are centered within the higher passbands.

U.S. Pat. No. 5,042,086, entitled "Method and means for transmitting large dynamic analog signals in optical fiber systems" issued on Aug. 20, 1991, to Cole et al., discloses a method and apparatus for transmitting a broad dynamic range of radio frequency ("RF") or microwave signals from a source of such signals (e.g., an antenna, to a remotely located receiver or a television or radar receiver), by phase modulating a beam of light, transmitting the modulated optical signal over a substantial distance using fiber optics, detecting and demodulating the optical signal to recover the RF or microwave analog signal, and using the recovered signal at the output receiver. Conversion of the analog information into a modulated optical signal is obtained by employing interferometers and placement of the modulated signals in quadrature to linearize the output.

U.S. Pat. No. 5,883,925 titled "Pulse code modulation compression mechanism" issued on Mar. 16, 1999 to Sinibaldi et al., discloses a pulse code modulation (PCM) unit connected to a bus in a computer system. Also, connected to the bus is a processor and memory. The PCM unit is connected to transmit and receive telephone lines. The PCM unit reads uncompressed PCM data from the memory over the bus and compresses the PCM data for transmission over the telephone line in a cycle steal operation, wherein the bus is not being used by the processor. The PCM receives compressed PCM data from the incoming telephone line, decompresses it, and writes the decompressed PCM data to the memory in a cycle steal operation.

From the foregoing description, it is apparent for instance, the teachings of U.S. Pat. No. 6,185,346 result in a very high data rate transmission capability. The teachings of the above discussed U.S. Pat. No. 6,362,903 B1, employing higher order modulation techniques for data transmission on previously unused passbands of the dispersion-limited optic link, result in an increase in the total capacity of the link. The U.S. Pat. No. 5,042,086 teaches toward the transmission of large data over a long distance very efficiently. Additionally, the teachings of the U.S. Pat. No. 5,883,925 provide for a digital transmission at very high speed over long distances. Although each of the prior art systems individually provide some advantages in terms of data rate, channel utilization, and coding efficiency, none of these systems provide a digital transmission system and method for high frequency analog signals, which would exhibit combined superior characteristics in terms data rate, channel utilization and coding efficiency. Therefore, there is a need for a system and method of digital transmission employing an improved modulation technique, which would provide combined superior characteristics in terms of data rate, channel utilization, and coding efficiency. Additionally, there remains a need for a system and method of digital transmission, which would provide improved noise performance and low energy loss and enable transmission of large amount of information over long distances.

SUMMARY OF THE INVENTION

The present invention relates to a system and method of digital transmission employing an improved modulation technique having both power and data range efficiency. This technique may be called, 'Conjugate Pulse Position Modulation' (CPPM), which utilizes multiple Digital Pulse Position Modulation (DPPM) formats, whereby M data bits/samples are conveyed by splitting them into sets of k bits/samples. A single coded pulse is generated as a representative code for every set of k bits/samples. Each of these coded pulses, which represents k-bits of data by its time position within the intra sample time, is transmitted within the same time space. Thus N such pulses will occupy the intra-sample duration. The first k-bit representative pulse will be positioned in the normal forward manner. The second k-bit pulse will be however be positioned on the conjugate pulse location within the same space. In particular, the method according to the present invention enables, for instance encoding 8 bits with 2 pulses providing the energy per bit much less than the PCM or DPPM techniques. The present invention is particularly useful, but not limited to, applications utilizing optic fiber communication lines.

In one broad aspect, an exemplary embodiment of the present invention is a communication system comprising a modulator, encoder, decoder, demodulator, and a data input source. The communication system employs an improved modulation technique that overcomes certain deficiencies associated with the prior art by effectively utilizing the conjugate signal space in Digital Pulse Position Modulation (DPPM) format, thereby achieving superior characteristics in terms of data rate, channel utilization, and coding efficiency. More specifically, the modulator of the communication system splits M data bits/samples into a plurality of sets of k bits/samples. A single pulse is positioned as a representative code for every set of k-bits, thereby sending only N=M/k pulses for M bits of data. An encoder encodes the split data bits into forward and conjugate pulse positions over a transmission channel, which is then demodulated at the receiver end.

According to another embodiment, the invention provides a method of transmitting digital data over a communication line in a Digital Pulse Position Modulation format, wherein M data bits are conveyed by splitting them into sets of k bits. A single pulse is positioned as a representative code for every set of k-bits, thereby sending only N=M/k pulses for M bits of data. Thereafter, the data is encoded to forward and forward pulse position over a transmission channel.

Accordingly, the present invention proposes a system and method for digital transmission which would provide improved noise performance and low energy loss and enable transmission of large amount of information over substantially long distances.

BRIEF DESCRIPTION OF THE DRAWINGS

The invention will be more readily understood by reference to the following description taken with the accompanying drawings, in which.

DETAILED DESCRIPTION OF EXEMPLARY EMBODIMENTS

Figure 1:
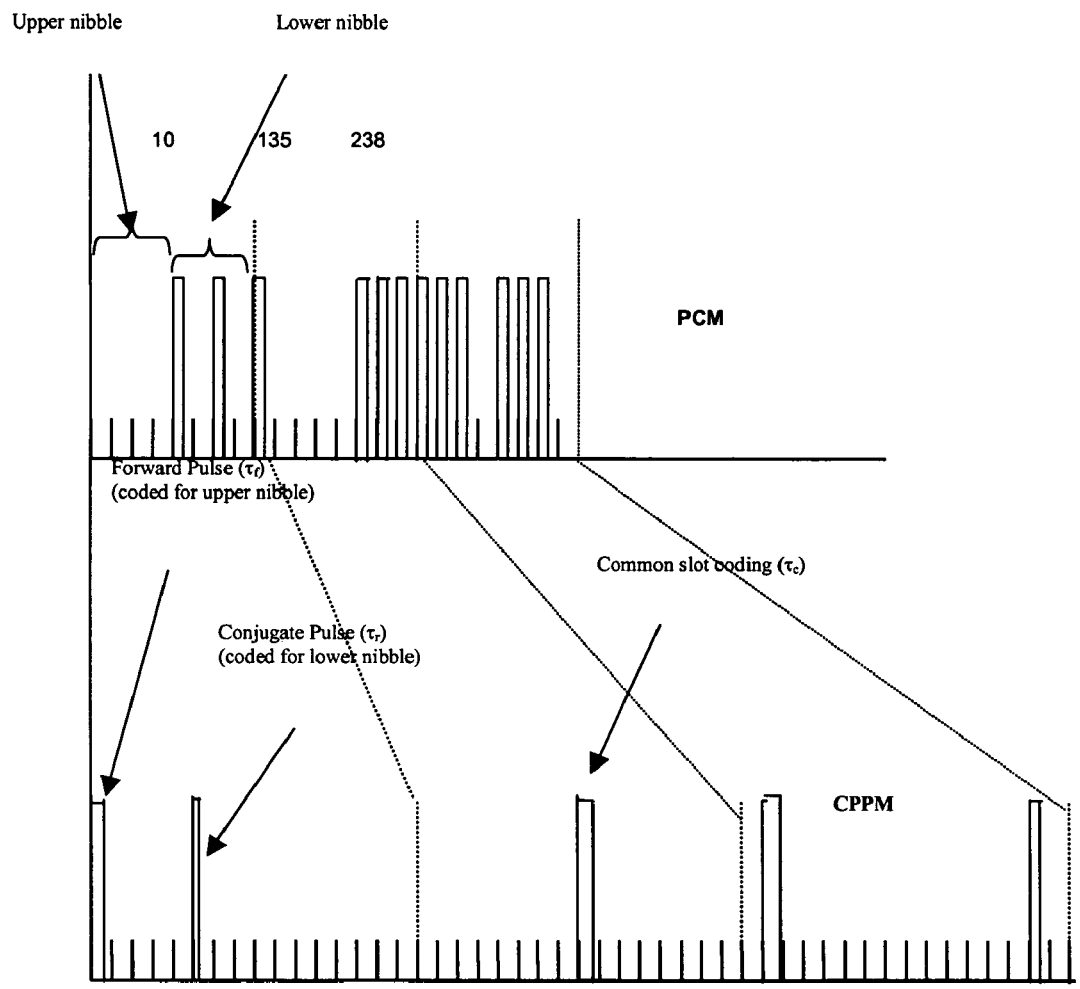
FIG. 1 is a comparative representation of the conventional Pulse Code Modulation (PCM) and Conjugate Pulse Position Modulation (CPPM) technique according to the present invention for a pulse transmission for 8 bit data input.

Referring to the drawings and particularly to FIG. 1 which shows the input data representation by PCM and by CPPM for the same input data, the CPPM modulator splits M bit digital data into sets of k bits wherein every set of k-bits is encoded by one unique pulse in one of the sub slots $n=2^k$, whereby sending only N pulses for M bits. The symbol interval referred to as time slot $T_n$ is subdivided into n sub slots each of width $T_n/n$.

For example, if N is chosen as 2, then the, upper M/2 bits may be coded with one pulse in forward direction of width $\tau_f$ occupying any of the 'n' sub-slots, while the lower M/2 bits may be coded by another pulse of width $\tau_r$ again occupying any of the same 'n' sub-slots, but in a conjugate manner.

The CPPM Time domain equation of a typical message $f_n(t)$ is give by:

$$S_{CPPM}(t) = \sum_{k=0}^{n-1} A\tau_f q[t - kT_s - k_{CPPM} f_n(t_{k_f})] + \sum_{k=n-1}^{0} A\tau_r q[t - kT_s - k_{CPPM} f_n(t_{k_r})] \quad (1)$$

wherein, q(t)=arbitrary coded pulse shape of amplitude A,
$\tau_f$ and $\tau_r$=forward & conjugate code pulse duration, &
$t_{k_f}$ & $t_{k_r}$=position of occurrence of the forward & conjugate code pulse.

The above time domain equation (1) is based on the following assumptions:

The input data of M-bit width is having even number of bits, which can be divided into N segments of k-bits each;

The forward and conjugate coded pulses can occupy the orthogonal 0 to $(2^k-1)$ and $(2^k-1)$ to 0 time positions respectively;

All the 'n' sub-slots will be jointly occupied at sometime by the forward and conjugate code pulses during the coding of the full M-bit input data sequence The identity of the forward and conjugate code pulse is based on the different pulse widths $\tau_f$ & $\tau_r$ respectively, except when both these pulses are co-located when it will be identified by a different pulse width $\tau_c$ the common code pulse.

For a CPPM system adopted for encoding P information signals, each of bandwidth $B_f$ using M bits per sample, the basic data rate is given by:

R=Pω$_s$M,t wherein ω$_s$ is the sampling rate per input channel and for Nyquist rate is 2 $B_f$.

The CPPM encoding rate $R_c$ will be different and is given by:

$R_c$=2P N $B_f$.

This data rate will be the upper bound while actually its rate shall be lower by a value 'n'. The frame duration is fixed and given by 'sampling interval/no. of information channels'

$T_n=1/P.\omega_s=1/2\pi Pf_s$

For sampling frequency $f_s$=8 kHz & M=8-bit data transmission/sample

Data rate/channel=M $f_s$=64 kbps;

No. of information channel P=16;

The slot duration=1/Pf$_s$=ts/16=7.8 us;

Sub-slot duration '$\pi_n$'=Frame interval/$2^k$=T$_n$/$2^k$=7.8 us/16=488 ns

Transmission data rate=(data rate/channel)*(no. of information channel)=Nfs*P=2.048 Mbps for the example taken.

During digitization, the degradation may be controlled in such a manner as to provide a fixed grade of service to the user. The Errors introduced at the coder end are as follows:
(a) due to amplitude quantization;
(b) due to jitter in time discretization. Process;

By the very nature of the CPPM signal, where information is carried by discrete positioning of a pulse pair to represent the corresponding code, the time interval between successive pulses will be random, making synchronization of a fixed frequency clock difficult. However, to decode the received data without any error, the receiver has to be synchronized with the transmitter by deriving the embedded clock information in the coming data stream, which is the CPPM pulse stream according to the present invention. At an instant relative to this clock signal, the received pulse position may be shifted from the transmitted one, either because of noise or due to clock instability or mismatch. Assuming that the noise is additive white Gaussian, the CPPM is subject to same or similar sources of error as in the case of DPPM [2] as follows:
(a) due to pulse being decoded in the slot other than in which it was transmitted, called the wrong slot error (probability of error of which is denoted by P$_r$);
(b) due to noise crossing the detector threshold and wrongly indicating the presence of the pulse before the actual position it was transmitted in, this is termed as false alarm error with probability P$_f$;
(c) due to noise causing the transmitted pulse to be suppressed below the detector threshold, and will be known as erasure error with probability P$_e$ Preferably, the CPPM encoder uses a thin pulse for forward pulse position coding and a relatively thicker pulse for conjugate pulse position coding, to allow the decoder to discriminate between these two pulses.

This discrimination can also lead to decoding errors if the pulse widths are affected by noise. The average error probability in forward Pulse Position system and in conjugate Pulse Position encoding may be assumed to be orthogonal and using the same 'n' available positions is:

$$P_{ef} = \frac{1}{n}\sum_{k=1}^{n} P_s(k) \quad (2)$$

$$\text{and } P_{ec} = \frac{1}{n}\sum_{j=n}^{n} P_s(j) \quad (3)$$

respectively, further assuming that all positions are equally probable

The average error probability for common slot error with n different symbols, is given by $$P_{ecs} = \frac{1}{n}\sum_{j=n}^{1}\sum_{k=1}^{n} P_s(k,j) \quad (4)$$

For a forward pulse placed in slot "k" and assuming that the joint probability of an erasure and a false alarm is negligible, is:

$$P_s(k)=P_r+(k-1)P_f$$

For a conjugate pulse placed in slot j, again assuming that the joint probability of an erasure and a false alarm is negligible and is given by $$P_s(k)=P_r+P_s+(j-1)P_f \quad (5)$$

For a common slot error (i.e. forward pulse slot k & conjugate pulse slot j being same), and considering the joint probability of forward & conjugate pulse slot (k, j). Erasure error for joint conditional probability for common slot is given by $$P_{ecs}(k)=P_r+P_s+(j-1)P_f+(k-1)P_f \quad (3.39)$$

$$= P_r + P_s + \frac{(n-1)}{2}P_f + \frac{(n-1)}{2}P_f \quad (6)$$

from which the average bit error probability P$_{eb}$ is determined as $$P_{eb} = (2^{n-1} - n)P_{ef} + (2^{n-1} - n)P_{ec} + 3nP_{ecs} = (2^{n-1} - n) \quad (7)$$

Besides the above stated error sources leading to Bit Error Rate (BER) in the decoded data stream their combinations can also occur which have been included in the above analysis, as they shall be orthogonal. Further, the pulse width based discriminator used to decode the forward and conjugate code position can also lead to BER as these widths can be in error due to pulse broadening or contraction effects of noise. However, these widths can be so selected as to have high robustness to this code aliasing. It must also be clarified that the common slot coding pulse width cannot occur with any other pulse and hence if that situation arises it will be recognized as a code violation and hence corrected by the decoder logic.

In order to evaluate the BER performance of the CPPM system, simulation of the system was carried out using Matlab Script, for 8-bit input data and with additive white Gaussian noise introduced in the channel modal. The BER performance of the CPPM system simulation was carried out on Binary Symmetric Channel.

Figure 2:
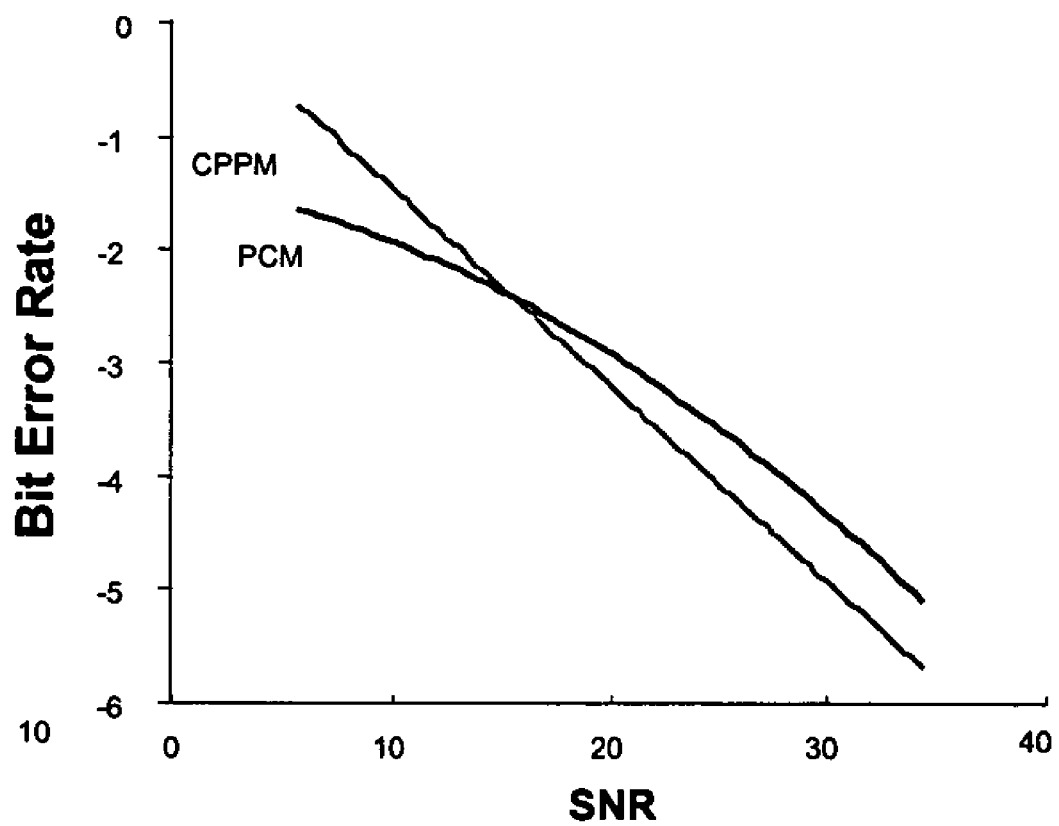
FIG. 2 is a graph of the Bit Error Rate (BER) performance results of the CPPM system compared with the results of the PCM.

FIG. 2 shows the simulated BER performance results of the CPPM system. The CPPM performance is seen to be clearly superior to that of the PCM system above 17 dB input SNR range, but inferior to it below this value. This justifies its use and efficacy in low error rate environment of Optical Fiber systems.

For M bits/samples transmission, having sampling frequency f$_s$ requirements of CPPM are compared to DPPM and PCM as indicated in TABLE 1.

TABLE 1

| Parameter | CPPM | PCM | DPPM |
|---|---|---|---|
| Minimum Bandwidth | nNω$_f$ where, n = $2^{M/N}$ | NMω$_f$ | nNω$_f$ where, n = $2^M$ |
| Data rate/channel | Nf$_s$bits/s | Mf$_s$bits/s | Mf$_s$bits/s |
| Transmission data rate | PNf$_s$ | PMf$_s$ | Pf$_s$ |
| Frame time = Samp. Time/inf. ch. | t$_s$/P | t$_s$/P | t$_s$/P |
| Max. No. of pulses/frame | N | M | 1 |
| Bit duration | Variable | fixed | fixed |
| No. of information channel | P | 2P | 1 |
| Avg. no. of pulses | <N | M/2 | 1 |

TABLE 1-continued

| Parameter | CPPM | PCM | DPPM |
|---|---|---|---|
| Tx/Sample | | | |
| Lower bound | N/2(common slot) | 0 | 1 |
| Upper bound | N. | M | 1 |
| Code word length | NP $(2)^{k+1} - 1$ | M/2 | 1 |

The comparative values of operational parameters of CPPM with commercial E1 type PCM transmission system in TABLE 2.

TABLE 2

| | CPPM | PCM |
|---|---|---|
| No of bits/Sa | 8 | 8 |
| Data rate/Ch. | N * fs = 16 kbps | M * fs = 64 kbps |
| No of info. Ch. | 16 | 32 |
| slot duration | ts/16 = 7.8 us | ts/32 = 3.9 us |
| no. of positions/frame | 16 | 8 |
| bit duration | 7.80 us/16 = 488 ns | 3.9 us/8 = 488 ns |
| Tx. Data Rate | Nfs * 16 = 2.048 Mbps | Mfs * 32 = 2.048 mbps |
| Min. tx. BW reqd. | 2,048 MHz | 2.048 MHz |
| average no. of pulse transmission/Sa | 1.9375 | 4 |
| Lower bound | 1 | 0 |
| Upper bound | 2 | 8 |
| Code word length | 1.9375 < 2 | 4 |

Figure 3:
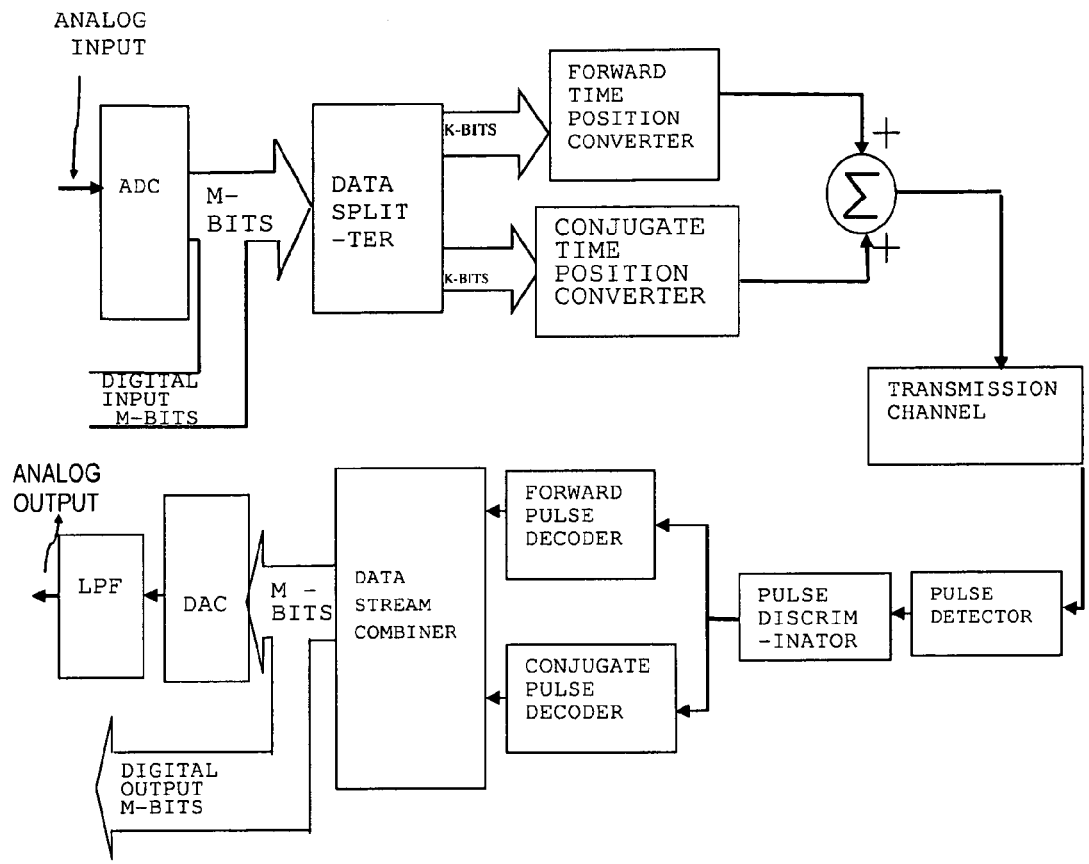
FIG. 3 is a block diagram of CPPM system in accordance with a preferred embodiment of the present invention.

FIG. 3 is a block diagram of a communication system incorporating the CPPM system in accordance with a preferred embodiment of the present invention. The system implementation is done such that, a modulator splits M bits/samples digital data into 'N' sets of k-bits/samples data chunks. For every set of k-bits, an encoder generates a time coded pulse, whereby sending N pulses for M-bits. Each of these coded pulses, which represent k-bits of data by its time position within the intra sample time, is transmitted within the same time space. Thus N such pulses will occupy the intra sample duration. The first k-bit representative pulse will be positioned in the normal forward manner. The second k-bit pulse will be however be positioned on the conjugate pulse location within the same space. If the same transmission bandwidth requirement is imposed, then k should be chosen such that, for any value of M-bit transmission N=M/k is a constant. Thus the number of sub-slots remains for all N sets $2^N$, now if the pulse width is also same, hence, bandwidth requirement will also be same. For example, for 8-bit digital data, if k is chosen to be 2 then N=4. Hence at every sample instant of time t=0 coding will takes place for both forward & conjugate pulse positioning, which when combined together will produce the desired CPPM signal.

CPPM modulator and demodulator design may be formulated around analogue-to-digital (ADC) and digital-to-analogue (DAC) converters on proposed architecture as shown in this figure. There can be various implementation strategies for the CPPM encoding based on analog-digital mixed circuit or all-digital circuit design meeting the required grade of performance and design complexity, which are also contemplated by the invention.

The receiver necessarily recovers the original base band message from the encoded CPPM signal. The receiver first detects the noise contaminated incoming CPPM waveform at the receiver input at the correct sub-slot location, thereafter, de-multiplexes the CPPM pulse stream into corresponding sub-slot positions and then reconstructs the originally transmitted signal sample from the pulse position data as accurately as possible. All these operation are straightforward, and are just the inverse of those performed in the transmitter.

Figure 4:
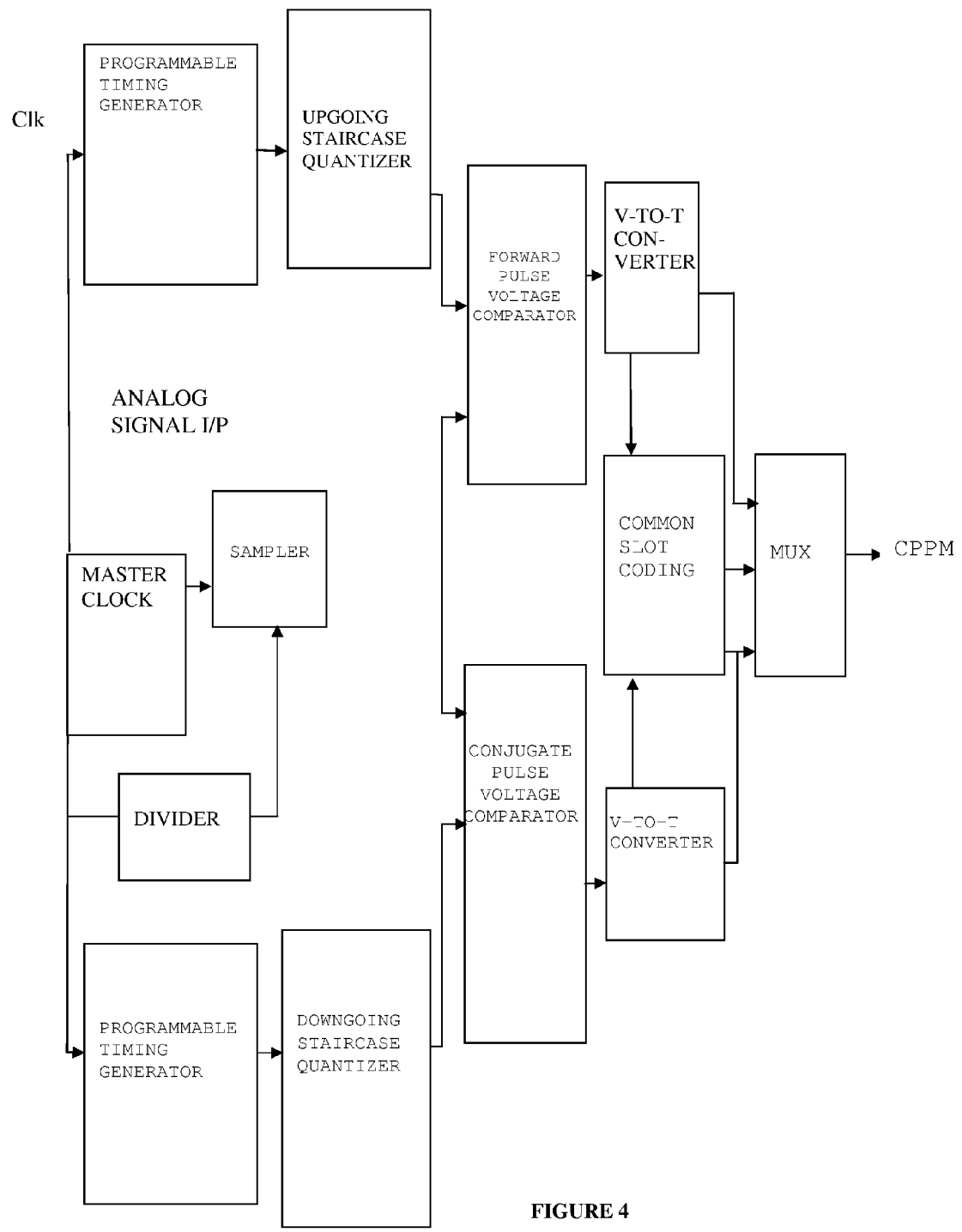
FIG. 4 is a block diagram of analog implementation of CPPM coder in accordance with a preferred embodiment of the present invention.

FIG. 4 is a block diagram of analog implementation of CPPM Coder in accordance with a preferred embodiment of the present invention. As shown in the figure a trailing edge digital pulse width modulated signal is generated by comparing the sampled signal against a negative slope linear staircase signal occupying the same intra sample time span. In a similar but conjugate manner a leading edge PWM signal is generated, here the reference staircase is of positive slope having the same number of steps and again occupying the same time frame. Generating the position indicating pulse for each of the N modulated edges of DPWM signals is the next step. These are then multiplexed into the forward and conjugate positioned pulses of different pulse widths (required to identify the pulses at receiver end). However, a special situation when the forward and conjugate pulse is co-located has to be separately coded. This common slot coding has been taken care of by having a third pulse width, which is different and larger, compared to forward and conjugate pulse code widths.

A typical naturally sampled forward PPM modulator is very similar to a trailing edge DPWM modulator, and consists simply of a comparator detecting equivalence between the input signal and a negative slope staircase signal followed by a negative edge triggered mono-stable. The high frequency constant step staircase generator is the critical part of the CPPM transmitter since a linear voltage-to-pulse position conversion characteristic is desired. In the same manner generating the leading edge digital pulse width modulated signal followed by a positive edge triggered mono-stable (pulse generating circuit) i.e. differentiating the modulated edges of leading edge DPWM, conjugated positioned pulses can be generated. There are various techniques of generating positive slope staircase signals for-leading edge DPWM, the technique used here, is based on charging a capacitor with a constant current source through a programmable timing generator controlled high frequency switch.

Figure 5:
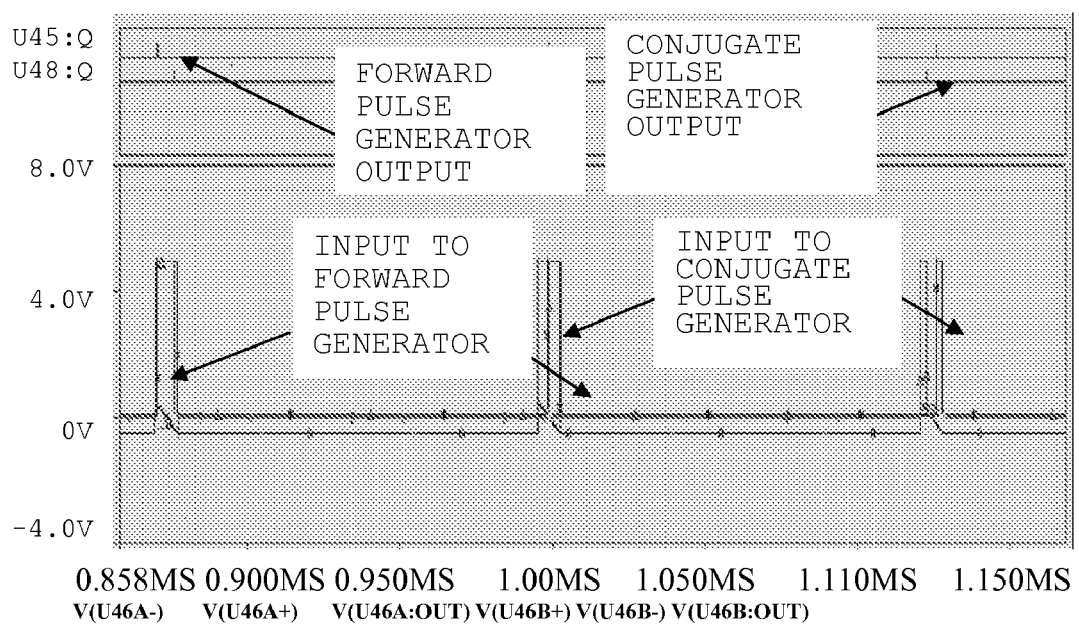
FIG. 5 shows the forward and conjugate pulse generated at the mono-shot pulse generator.

FIG. 5 shows the forward and conjugate pulse generated at the mono-shot pulse generator.

Figure 6:
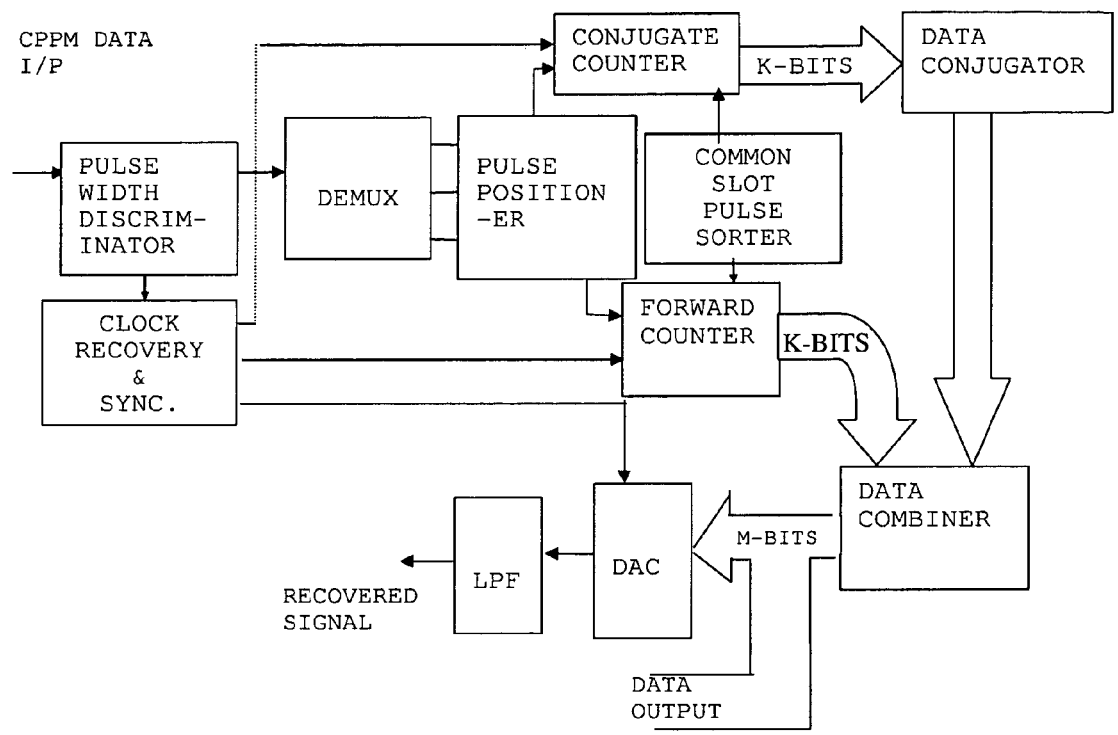
FIG. 6 is a block diagram of the CPPM demodulator in accordance with a preferred embodiment of the present invention.

FIG. 6 is a block diagram of the CPPM demodulator in accordance with a preferred embodiment of the present invention. Demodulation is achieved by first de-multiplexing the CPPM forward & conjugate pulses within the symbol interval. Sorting and identifying the forward, conjugate and co-located pulses and then decoding them to get the original coded digital data. This decoded data is then converted into analog base band signal using a DAC followed by a low pass filter. However, for de-multiplexing and decoding the CPPM input signal it is essential to have access to an accurate clock signal at the receiver. Clearly, clock pulses could be transmitted with the data pulses, either in every unit interval or at some less frequent intervals. These timing pulses could be separated in the receiver by a dedicated logic, so that the timing signal is not corrupted by 'message noise'. The drawback of this scheme is that the transmission overheads are high, compared to a system implemented without clock signal transmission. Further since the transmitted pulses also carry the clocking information, albeit indirectly they can be used to derive the clocking information. Therefore the receiver has to have a separate block to extract the clock information from the received data stream using a clock recovery technique, and de-multiplex & decode the data using this extracted clock from a PLL or a PLL based recovery system.

Decoding the CPPM signal is relatively more complex when compared with DPPM. It is performed by discriminating between the forward & conjugate pulses in the CPPM signal and then counting the number of discrete time slots between start of symbol boundaries & rising edge of each of the coded pulses. The recovered slot clock is used to generate the sampling points and count the number of discrete time slots between start of symbol slot & rising edge of decoded pulse. Positive edge of the sampling pulse recovered from CPPM signal through DPLL is used to load the value of the counter into the data latch, and the positive edge of the discriminated CPPM pulses is then used to reset the counters. DAC is used to convert the digital data into analog signal followed by the LPF to recover the analog base band signal.

Thus, while there have been shown and described and pointed out fundamental novel features of the present invention as applied to preferred embodiments thereof, it will be understood that the described embodiments are to be considered in all respects only as illustrative and not restrictive and various omissions, substitutions and changes in the form and details of the methods described may be made by those skilled in the art without departing from the spirit of the present invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is the intention, therefore, to be limited only as indicated by the scope of the claims appended hereto. All changes which come within the meaning and range of equivalency of the claims are to be embraced within their scope.

What is claimed is:

1. A system comprising:
   a pulse width discriminator operable to couple to a data transmission channel, receive a signal from the transmission channel, and detect the signal at a correct sub-slot location,
   wherein the signal has combined forward and conjugate pulse positions;
   a clock operably coupled to the pulse width discriminator;
   a demultiplexer operably coupled to the pulse width discriminator and operable to demultiplex the pulse stream in the signal into corresponding sub-slot positions;
   a pulse positioner operably coupled to the demultiplexer;
   a conjugate counter operably coupled to the pulse positioner and operbly coupled to the clock;
   a forward counter operably coupled to the pulse positioner and the clock;
   a common slot pulse sorter operably coupled to the conjugate counter and the forward counter;
   a data conjugator operably coupled to the conjugate counter;
   a data combiner operably coupled to the data conjugator and the forward counter; and
   a digital-to-analog converter operably coupled to the data combiner,
   wherein the system reconstructs an original signal sample from the forward and conjugate pulse positions.

2. The system according to claim 1, wherein the forward and conjugate pulse positions are generated by a mono shot pulse generator.

3. The system according to claim 1, wherein the digital-to-analog converter is operably coupled to the clock.

4. The system according to claim 1, further comprising:
   a low-pass filter operably coupled to the digital-to-analog converter to generate an analog base band signal from the digital-to-analog converter.

5. The system according to claim 1, wherein the system adapts the signal between the forward and conjugate pulse positions in the signal.

6. The system according to claim 1, wherein the signal has a thin pulse for forward pulse position coding and a relatively thicker pulse for conjugate pulse position coding.

7. The system according to claim 1, wherein the system combines the forward and conjugate pulse positions into a digital output.

8. A method comprising:
   splitting input digital data bits/samples into a plurality of data bit/sample sets; and
   encoding forward and conjugate pulse positions over a data transmission channel using forward and conjugate time position converters,
   wherein the encoding includes adapting the plurality of data bit/sample sets by separating the plurality of data bit/sample sets into the forward and conjugate pulse positions over the data transmission channel,
   wherein a first representative pulse of the forward pulse position is positioned in a forward manner and a second representative pulse of the conjugate pulse position is positioned on a conjugate pulse within a same space, and
   wherein a thin pulse of the forward pulse position is used for forward pulse position coding and a relatively thicker pulse of the conjugate pulse position is used for conjugate pulse position coding.

9. The method according to claim 8, wherein the thin pulse is generated by the forward time position converter and the thicker pulse is generated by the conjugate time position converter.

10. The method according to claim 8, wherein the forward and conjugate pulse positions are generated by a mono-shot pulse generator.

11. A method comprising:
    generating a trailing-edge digital pulse-width modulated signal from a digital input signal by comparing a sampled signal to a negative slope staircase signal having a number of steps, the negative slope staircase signal occupying a same intra sample time span of the sampled signal;
    generating a leading-edge digital pulse-width modulated signal from the digital input signal by comparing the sampled signal to a positive slope staircase signal having the same number of steps, and occupying the same intra sample time span of the negative slope staircase signal;
    generating a position indicating pulse for each modulated edge of the tailing edge and leading edge of the digital pulse-width modulated signals, yielding a plurality of pulse positions;
    multiplexing the plurality of pulse positions into forward and conjugate positioned pulses of different pulse widths;
    detecting equivalence between the input signal and the negative slope staircase signal followed by a negative edge triggered mono-stable, to produce a linear voltage-to-pulse position conversion characteristic; and
    generating the conjugate positioned pulse by generating the leading edge digital pulse-width modulated signal and by generating a subsequent positive edge triggered mono-stable that differentiates modulated edges of the leading edge digital pulse-width modulated signal.

12. The method according to claim 11, wherein a thin pulse of the forward positioned pulse is used for forward pulse position coding and a relatively thicker pulse of the conjugate positioned pulse is used for conjugate pulse position coding.

13. The method according to claim 11, wherein the forward and conjugate positioned pulses are generated by a monoshot pulse generator.

14. The method according to claim 11, wherein the method further comprises generating the positive slope staircase signal
by charging a capacitor with a constant current source.

15. The method according to claim 11, wherein the method further comprises:
generating the positive slope staircase signal by charging a capacitor with a constant current source through a programmable timing generator controlled high frequency switch.

16. The method according to claim 11, wherein a forward positioned pulse converter is operable to use a thin pulse of the forward positioned pulse for forward pulse position coding.

17. The method according to claim 16, wherein a conjugate positioned pulse converter is operable to use a relatively thicker pulse of the conjugate positioned pulse for conjugate pulse position coding.

18. The method according to claim 11, wherein the forward and conjugate positioned pulses are combined into digital output.

19. The method according to claim 11 further comprising:
converting an analog input signal into the digital input signal.

20. The method according to claim 19 further comprising:
splitting the digital input signal into a plurality of data bit/sample sets.

* * * * *